(12) United States Patent
Piccinelli

(10) Patent No.: US 12,146,065 B2
(45) Date of Patent: Nov. 19, 2024

(54) WATER-BASED CERAMIC DYE

(71) Applicant: CEVP SAGL, Lugano (CH)

(72) Inventor: Piero Piccinelli, Bologna (IT)

(73) Assignee: CEVP SAGL, Lugano (CH)

(*) Notice: Subject to any disclaimer, the term of this patent is extended or adjusted under 35 U.S.C. 154(b) by 604 days.

(21) Appl. No.: 17/431,026

(22) PCT Filed: Feb. 24, 2020

(86) PCT No.: PCT/EP2020/054770
§ 371 (c)(1),
(2) Date: Aug. 13, 2021

(87) PCT Pub. No.: WO2020/173875
PCT Pub. Date: Sep. 3, 2020

(65) Prior Publication Data
US 2022/0135817 A1  May 5, 2022

(30) Foreign Application Priority Data

Feb. 25, 2019  (IT) .................. 102019000002701

(51) Int. Cl.
*C09D 11/322* (2014.01)
*B41M 5/00* (2006.01)
(Continued)

(52) U.S. Cl.
CPC ......... *C09D 11/322* (2013.01); *B41M 5/0023* (2013.01); *B41M 5/0047* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00;
(Continued)

(56) References Cited

U.S. PATENT DOCUMENTS 5,273,575 A * 12/1993 de Saint Romain ... C09D 11/36
106/31.86
6,402,823 B1 * 6/2002 Garcia Sainz ......... C09D 11/40
106/31.62
(Continued)

FOREIGN PATENT DOCUMENTS

CN  101947439 A  1/2011
CN  105175027 B  8/2017
(Continued)

OTHER PUBLICATIONS

1 Chinese Office Action dated Jul. 29, 2022 for Chinese Appl. No. 202080013677.2.
(Continued)

*Primary Examiner* — Manish S Shah
(74) *Attorney, Agent, or Firm* — Ohlandt, Greeley and Perle, LLP

(57) ABSTRACT

The invention relates to a colouring composition, preferably an ink for ink jet printing, comprising:
(A) 3.0-15.0% by weight of Ti in the form of a titanium compound obtained by a process comprising:
  (i) reacting at least one titanium alkoxide with water and, optionally, at least one alcohol, thereby obtaining a reaction mixture;
  (ii) adding glycolic acid in a Ti:acid molar ratio comprised between 1:0.8 and 1:2.0, thereby generating a mixture of water and alcohol comprising an intermediate titanium compound;
  (iii) optionally, but preferably, removing part of the mixture comprising water and alcohol;
  (iv) adding at least one compound of formula $N(R2)_3$ with a Ti:$N(R2)_3$ molar ratio comprised between 1:0.20 and 1:1.50; and
  (v) completely eliminating the alcohol;
(B) 0.2-2.5% by weight of Cr and/or Ni in the form of at least one water-soluble organic compound of Cr and/or Ni;
(C) up to 100% by weight of at least one solvent selected from the group consisting of water, organic solvents miscible with water and mixtures thereof,
wherein the quantities (A), (B) and (C) refer to the overall weight of the colouring composition.

21 Claims, No Drawings

(51) Int. Cl.
*B41M 7/00* (2006.01)
*C04B 41/00* (2006.01)
*C04B 41/45* (2006.01)
*C04B 41/46* (2006.01)
*C04B 41/82* (2006.01)
*C09D 11/033* (2014.01)
*C09D 11/037* (2014.01)
*C09D 11/40* (2014.01)

(52) U.S. Cl.
CPC ............ *B41M 5/007* (2013.01); *B41M 7/009* (2013.01); *C04B 41/009* (2013.01); *C04B 41/4543* (2013.01); *C04B 41/4554* (2013.01); *C04B 41/4578* (2013.01); *C04B 41/463* (2013.01); *C04B 41/82* (2013.01); *C09D 11/033* (2013.01); *C09D 11/037* (2013.01); *C09D 11/40* (2013.01)

(58) Field of Classification Search
CPC .... B41M 7/0072; B41M 5/52; B41M 5/5218; B41M 5/5227
See application file for complete search history.

(56) References Cited

U.S. PATENT DOCUMENTS

| | | | |
|---|---|---|---|
| 2008/0210122 A1* | 9/2008 | Magdassi | ................... B41J 2/01 523/160 |
| 2010/0291362 A1* | 11/2010 | Vignali | .................. B41M 5/007 428/210 |
| 2017/0015687 A1* | 1/2017 | Vignali | ...................... B41J 2/01 |
| 2018/0094148 A1 | 4/2018 | Wu et al. | |

FOREIGN PATENT DOCUMENTS

| | | |
|---|---|---|
| EP | 3 284 792 A1 | 2/2018 |
| WO | 2016/012538 A1 | 1/2016 |

OTHER PUBLICATIONS

International Search Report dated Apr. 29, 2020 from corresponding International Patent Application No. PCT/EP2020/054770, 5 pages.
Written Opinion dated Apr. 29, 2020 from corresponding International Patent Application No. PCT/EP2020/054770, 6 pages.
International Preliminary Report on Patentability dated Feb. 17, 2021 from corresponding International Patent Application No. PCT/EP2020/054770, 6 pages.

* cited by examiner

WATER-BASED CERAMIC DYE

The present invention relates to a water-based dye for the decoration of a raw ceramic paste containing a high concentration of titanium. The composition is preferably an ink for digital printing on ceramics.

PRIOR ART

Starting from the early 2000s, the technology of decoration through digital printing became established in the ceramic sector, generally using ink jet printers.

Digital printing has allowed significantly improving the aesthetic qualities of ceramic products, making it possible to create products decorated with extremely complex motifs, such as tiles for floors or coverings that reproduce the appearance of marble and natural wood surfaces.

In the traditional ceramic decoration processes, each colour was made by applying a colouring composition containing a combination of chromophoric ions able to develop the desired colour tone when fired.

In the digital printing, the desired colour tone is obtained from the mixing of the inks forming the print set on the decorated surface.

Each set of inks must therefore be able to provide a range of colours (so-called gamut) that represents a more or less large portion of the colorimetric space: the broader the gamut that can be provided with a given set of inks, the greater amount of colour hues can be obtained with that determined set.

To obtain a sufficiently broad gamut, a set of inks generally comprises, among others, an ink capable of developing a colour tending to yellow following the firing of the coloured paste.

The inks used in digital printing devices are generally constituted by an organic solvent or a mixture of organic solvents immiscible with water, and one or more finely ground pigments dispersed in the solvent. These inks are normally used for the creation of surface decorations on glazed materials.

Alternatively, to create non-glazed products coloured also inside the ceramic mass, solvent-based inks are used in which the colouring component is constituted by organic compounds of chromophoric metals completely soluble in the organic solvent. The chromophoric metals give rise to the development of colouration during the firing of the coloured products.

Inks containing organic solvents immiscible with water are conventionally known in the field as "solvent-based inks".

By contrast, inks in which the solvent is water, optionally in a mixture with organic solvents miscible with water, are conventionally called "water-based inks".

Water-based inks have some unquestionable advantages with respect to solvent-based inks. These advantages are mainly linked to improved safety and hygiene conditions, since the solvents used in solvent-based inks generally have rather low flash points and/or sometimes present a high danger to health. Another advantage is the reduction of the environmental impact of the decoration process, in particular due to the emission of the total or partial combustion products of the organic component of the ink.

In the field of ceramic decoration with traditional technologies, it is known that to obtain the colour yellow, water-based solutions can be used containing soluble compounds of Cr in combination with soluble compounds of Sb and/or W and soluble compounds of Ti, said solutions being able to develop, after firing, a yellow colour on ceramic materials not additivated with titanium dioxide.

Patent EP940379 describes colouring solutions containing 2-6% by weight of Ti, 3-12% by weight of Sb and/or 4-14% by weight of W and 0.2-2.5% by weight of Cr.

U.S. Pat. No. 6,114,054 describes aqueous colouring solutions for ceramics containing 2.0% by weight of Cr, 1.4% by weight of Sb and 8.8% by weight of Ti as titanate bis(ammonium lactate) dihydroxide.

The colouring solutions described above may not however be used for digital printing on ceramics because they do not have the chemical-physical characteristics necessary for use in the digital printing devices.

Patent application WO2009/077579 discloses an ink set for ink jet printing on ceramics, in which the yellow colour is obtained with an ink (composition C2) containing, in addition to an organic soluble compound of chromium or nickel in combination with an organic soluble compound of tungsten or antimony, also an organic compound of titanium. Said ink normally contains 0.5-7.0% by weight of Ti in the form of titanium carboxylate, preferably titanate bis(ammonium lactate) dihydroxide. The set of inks described is used in a digital printing process on ceramic materials additivated with titanium dioxide.

The simultaneous presence of chromium and titanium, and preferably also of antimony, in the coloured portion of the ceramic material is therefore a requirement for the development of the colour yellow during the firing of the coloured paste.

The hue and saturation of the yellow colour obtained depend to a large extent on the quantity ratio of the chromophoric metals in the coloured portion of the ceramic paste. In particular, with an equal concentration of chromium, and optionally of antimony, the yellow hue is more saturated and intense, the greater the concentration of titanium in the coloured portion of the paste.

Since, as shown in patent EP940379, the addition of high quantities of titanium dioxide in the paste causes an alteration of the hue developed by other chromophoric metals applied on the additivated paste, there is a widespread demand for water-based colouring compositions, in particular water-based inks, containing high concentrations of Ti.

In this context, the present invention sets out to provide a water-based colouring composition that develops a yellow colour, or one tending to yellow, during the firing of the ceramic paste.

The invention also sets out to provide a simple process of decorating raw ceramic pastes through which to obtain a yellow colour, or one tending to yellow, of the ceramic paste after firing.

A further object of the invention is to provide a water-based ink for ink jet printing on a raw ceramic paste, which develops a yellow colour, or one tending to yellow, during the firing of the ceramic paste, and which is capable of providing a sufficiently broad gamut when used in combination with additional inks for ink jet printing.

Moreover, a further object of the invention is to provide a ceramic colouring composition, in particular an ink for ink jet printing on ceramics, which penetrates the raw ceramic material, thus allowing the creation of lapped or smoothed items after firing, in particular lapped or smoothed tiles.

SUMMARY OF THE INVENTION

In a first aspect, the invention relates to a colouring composition, preferably an ink for ink jet printing, comprising:

(A) 3.0-15.0% by weight of Ti in the form of a titanium compound obtained/obtainable by a process comprising the steps of:
  (i) reacting at least one titanium alkoxide of formula Ti(OR1)$_4$, wherein R1 is a linear or branched C1-C4 saturated alkyl radical, with water and, optionally, at least one alcohol, thereby obtaining a first reaction mixture;
  (ii) adding glycolic acid to the reaction mixture of step (i) in a Ti:acid molar ratio comprised between 1:0.8 and 1:2.0, thereby obtaining a second reaction mixture comprising water, alcohol and at least one intermediate titanium compound;
  (iii) optionally, but preferably, at least partially removing the water and alcohol from the second reaction mixture;
  (iv) adding to the mixture of step (ii) or of step (iii) at least one compound of formula N(R2)$_3$, wherein the R2 groups, whether the same or different from each other, are independently selected from the group consisting of H, –CO(NH$_2$), linear or branched C1-C4 alkyl radicals, linear or branched C1-C4 alcohols, and combinations thereof, in a Ti:N(R2)$_3$ molar ratio comprised between 1:0.20 and 1:1.50; and
  (v) completely eliminating the alcohol from the mixture of step (iv);
(B) 0.2-2.5% by weight of Cr and/or Ni in the form of at least one water-soluble organic compound of Cr and/or at least one water-soluble organic compound of Ni;
(C) up to 100% by weight of a solvent selected from the group consisting of water, organic solvents miscible with water and mixtures thereof,
wherein the quantities (A), (B) and (C) refer to the overall weight of the colouring composition.

The invention also relates to a process for decorating ceramics, preferably an ink jet printing process on ceramics, comprising the steps of:
  (1) applying, preferably ink jet printing, the colouring composition onto the surface of an additivated paste comprising a mixture of raw ceramic materials comprising a total amount of less than or equal to 2.00% by weight of titanium dioxide, thereby obtaining a decorated ceramic paste;
  (2) optionally, but preferably, drying the decorated ceramic paste;
  (3) firing the decorated, and optionally dried, ceramic paste in a ceramic kiln at a temperature of 900°-1300° C.

DETAILED DESCRIPTION OF THE INVENTION

In the context of the present description and the appended claims, the percentages are expressed by weight, unless otherwise indicated.

In the context of the present description and the appended claims, "water-soluble organic compound" refers to an organic compound that at a temperature of 25°±2° C. is completely soluble in water at the indicated concentration, without the presence of any deposit in the aqueous solution.

In the context of the present description and the appended claims, "organic solvent miscible with water" indicates an organic solvent that at a temperature of 25°±2° C. forms a homogeneous mixture with water.

In a first aspect thereof, the present invention relates to a colouring composition, preferably an ink for ink jet printing, comprising:

(A) 3.0-15.0% by weight, preferably 8.0-15.0% by weight, more preferably 7.0-12.5% by weight, of Ti in the form of a titanium compound obtained/obtainable by a process comprising:
  (i) reacting at least one titanium alkoxide of formula Ti(OR1)$_4$, wherein R1 is a linear or branched C1-C4 saturated alkyl radical, with water and, optionally, at least one alcohol, thereby obtaining a first reaction mixture;
  (ii) adding glycolic acid to the reaction mixture of step (i) in a Ti:acid molar ratio comprised between 1:0.8 and 1:2.0, thereby obtaining a second reaction mixture comprising water, alcohol and at least one intermediate titanium compound;
  (iii) optionally, but preferably, at least partially removing the water and alcohol from the second reaction mixture;
  (iv) adding to the mixture of step (ii) or of step (iii) at least one compound of formula N(R2)$_3$, wherein the R2 groups, whether the same or different from each other, are independently selected from the group consisting of H, —CO(NH$_2$), linear or branched C1-C4 alkyl radicals, linear or branched C1-C4 alcohols, and combinations thereof, in a Ti:N(R2)$_3$ molar ratio comprised between 1:0.20 and 1:1.50; and
  (v) completely eliminating the alcohol from the mixture of step (iv);
(B) 0.2-2.5% by weight, preferably 0.8-1.5% by weight, of Cr and/or Ni in the form of at least one water-soluble organic compound of Cr and/or at least one water-soluble organic compound of Ni;
(C) up to 100% by weight of a solvent selected from the group consisting of water, organic solvents miscible with water and mixtures thereof,
wherein the quantities (A), (B) and (C) refer to the overall weight of the colouring composition.

In step (i) of the process for obtaining the component (A) the titanium alkoxide can be selected from the group consisting of titanium tetra-methoxide, titanium tetra-ethoxide, titanium tetra-n-propoxide, titanium tetra-n-butoxide, titanium tetra-ter-butoxide, titanium tetra-isopropoxide, and mixtures thereof. Advantageously, the titanium alkoxide can be titanium tetra-isopropoxide.

In step (i) the titanium alkoxide is reacted with water and, optionally but preferably, at least one alcohol.

In one embodiment, the alcohol can be a linear or branched C1-C6 alcohol, more preferably the alcohol can be selected from the group consisting of methanol, ethanol, 1-propanol, 2-propanol, 1-butanol, 2-methyl-1-propanol, 2-methyl-2-propanol, and mixtures thereof. Preferably the titanium alkoxide is reacted with a mixture comprising water and 2-propanol.

In the reaction of the titanium alkoxide with water, and optionally at least one alcohol, low-boiling alcohols are developed as reaction coproducts.

Advantageously the alcohol optionally added in step (i) can be the same alcohol which develops from the hydrolysis of the titanium alkoxide. For example, when titanium isopropoxide is used, it can preferably be used in a mixture of water and isopropyl alcohol.

In step (i) the titanium alkoxide, water and optionally at least one alcohol, can be mixed together in any order.

In a preferred embodiment, water is slowly added under stirring to a mixture of titanium alkoxide in alcohol. The reaction is strongly exothermic. At the end of the addition of water, the formation of a white solid in suspension is observed.

In step (ii) glycolic acid in a Ti:acid molar ratio comprised between 1:0.8 and 1:2.0, preferably in a molar ratio comprised between 1:0.9 and 1:1.1, more preferably in a molar ratio of about 1:1 is added to the reaction mixture (suspension) of step (i).

Optionally, but preferably, at the end of step (ii) the process may comprise a step (iii) of removing, preferably distilling, part of the mixture comprising water and alcohol.

Step (iii) is carried out by heating the mixture of step (ii) to the distillation temperature of the alcohol/water mixture and this step (iii) is preferably interrupted when at least 70% by weight of the alcohol/water mixture has been distilled.

Preferably, in step (iv) at least one compound of formula $N(R2)_3$ is selected from the group consisting of diethylamine, diisopropylamine, triethanolamine, monoethanolamine and mixtures thereof can be added to the mixture of step (ii) or of step (iii), preferably it can be monoethanolamine, in the Ti:monoethanolamine molar ratio indicated above. In one embodiment, the compound of formula $N(R2)_3$ can be monoethanolamine, in a Ti:monoethanolamine molar ratio comprised between 1:0.30 and 1:0.50.

In the next step (v) the alcohol is completely eliminated from the mixture of step (iv), preferably by distilling the water/alcohol mixture.

At the end of the process a colour solution ranging from light yellow to amber is obtained, comprising 12.0-19.0% by weight of titanium (element). The titanium compound can be purified using techniques known in the art and used for the preparation of the colouring composition.

In a preferred embodiment, the solution obtained at the end of step (v) can be used as such in the preparation of the colouring composition.

The preparation of the titanium compound can be preferably carried out in an inert environment, for example in a nitrogen atmosphere, and under vacuum, preferably at a pressure less than or equal to 3.0 kPa, preferably at a pressure less than or equal to 0.3 kPa.

In one embodiment, the colouring composition can comprise 8.0-15.0% by weight, more preferably 7.0-12.5% by weight of titanium, in the form of the titanium compound described above in detail.

The component (B) of the colouring composition is selected from the group consisting of water-soluble organic compounds of Cr, water-soluble organic compounds of Ni and mixtures thereof, preferably it is at least one water-soluble organic compound of Cr.

In one embodiment, the water-soluble organic compound of Cr and/or the water-soluble organic compound of Ni can be selected from the group consisting of:
ascorbate,
acetylacetonate,
compounds of Cr and/or Ni with at least one carboxylic acid of formula R3-COOH
wherein R3 is selected in the group constituted by
(a) —H;
(b) —COOH;
(c) a radical of formula —$C(R4)_3$ wherein the R4 groups are the same or different from each other, and are independently selected from:
(c.1) —H;
(c.2) a group of formula [1]

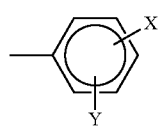

[1]

wherein X and Y are the same or different from each other and are independently selected from —$CH_3$, OH and COOH;
(c.3) —$N(R5)_2$ wherein the R5 groups are the same or different from each other and are independently selected from H, linear or branched C1-C4 saturated alkyl groups optionally substituted with at least one substituent selected from the group consisting of —OH, —$(CH_2)$n-COOH wherein n is an integer comprised between 1 and 3, —$(CH_2)$m-$N(H)_{2-k}$—$(CHR6-COOH)_k$ wherein m is an integer comprised between 1 and 6, k is 1 or 2 and R6 is selected from —H and —$CH_3$, a group of formula [1] as described above, and combinations thereof;
(d) a linear or branched C1-C5 saturated or unsaturated alkyl group, optionally substituted with at least one substituent selected from the group consisting of —OH, —SH, —$NH_2$, —COOR7, wherein R7 is H or a linear or branched C1-C4 saturated aliphatic group, and combinations thereof;
(e) an aromatic group of formula [1] as described above; and
(f) combinations thereof; and
mixtures thereof.

Preferably, the water-soluble organic compounds of Cr and/or Ni can be compounds of Cr and/or Ni with at least one carboxylic acid selected from the group consisting of formic acid, acetic acid, propionic acid, butanoic acid, lactic acid, glycolic acid, oxalic acid, tartaric acid, citric acid, maleic acid, fumaric acid, citraconic acid, gluconic acid, thioglycolic acid, glycine, adipic acid, 6-aminohexanoic acid, aminoadipic acid, 4-aminobutanoic acid, 2-amino-4-hydroxybutanoic acid, 2-aminobutanoic acid, aspartic acid, salicylic acid, nitrilotriacetic acid, ethylenediaminetetraacetic acid (EDTA), hydroxy ethylenediaminetriacetic acid, 1,3-propylene diamine tetracetic acid, methylglycinediacetic acid, diethylenetriamine-pentaacetic acid (DTPA), and combinations thereof.

The organic compounds of Cr and/or Ni reported above are generally available on the market or are easily obtainable by reaction between a compound of Cr and/or of Ni, e.g. an inorganic salt, and the corresponding carboxylic acid.

Optionally, these compounds of Cr and/or Ni can be treated with at least one basic compound selected from ammonia, amines, sodium hydroxide, potassium hydroxide and mixtures thereof, increasing their stability and/or solubility in water.

In one embodiment, the component (B) is chromium acetate.

The colouring composition can comprise 0.2-2.5% by weight of Cr and/or Ni (expressed as elements), preferably 0.8-1.5% by weight.

Percentages of Cr and/or Ni below 0.2% by weight give rise to the development of a yellow colouration of insufficient intensity. Concentrations of Cr and/or Ni higher than 2.5% bring the hue of the colour developed from the colouring composition during firing towards green, in the case of chromium, or towards beige in the case of nickel.

In one embodiment, the weight ratio between Ti and Cr and/or Ni in the colouring composition, preferably the ratio Ti:Cr, can be comprised between 20:1 and 2:1, preferably between 10:1 and 5:1.

In one embodiment, the component (C) is at least one organic solvent miscible with water selected from the group consisting of alkanolamines, polyalcohols, glycols, ethers, glycol ethers and mixtures thereof, preferably from the group consisting of monoethanolamine, diethanolamine, triethanolamine, monoethylene glycol, diethylene glycol, triethylene glycol, dipropylene glycol monomethyl ether, glycerol and mixtures thereof.

In one embodiment, the component (C) can comprise water, preferably demineralised water and/or water with a content of chlorides and/or sulphates less than or equal to 10 ppm and 10-40% by weight of at least one organic solvent miscible with water, preferably at least one organic solvent selected from the group consisting of monoethanolamine, diethanolamine, triethanolamine, monoethylene glycol, diethylene glycol, triethylene glycol, dipropylene glycol monomethyl ether, glycerol and mixtures thereof, wherein the amount of the at least one organic solvent refers to the total weight of the colouring composition.

In one embodiment component (C) consists of the components listed above.

Preferably, the colouring composition is a single-phase composition and therefore does not comprise organic solvents immiscible with water.

In one embodiment, the colouring composition can further comprise as component (D) 1.0-8.0% by weight of W and/or Sb, preferably 2.5-5.5% by weight, in the form of a water-soluble organic compound of W and/or a water-soluble organic compound of Sb, wherein the amount of component (D) refers to the overall weight of the colouring composition.

In one embodiment, the colouring composition can comprise Ti, Cr and Sb and/or W in the following weight ratios:
Ti:(Sb and/or W) comprised between 5:1 and 1:1; and/or
(Sb and/or W):Cr comprised between 4:1 and 1:1.

Preferably, the colouring composition can comprise at least one organic compound of Sb in the amount and in the molar ratios indicated above. The colouring compositions comprising Sb have a longer shelf-life with respect to the colouring compositions comprising W.

The water-soluble organic compounds of Sb and/or water-soluble organic compounds of W can be preferably selected from the group consisting of:
ascorbate;
acetylacetonate;
compounds with at least one carboxylic acid of formula R3-COOH wherein R3 is as described above in detail; and
mixtures thereof.

Preferably, the water-soluble organic compounds of Sb and/or W can be compounds of Sb and/or W with at least one carboxylic acid selected from the group consisting of formic acid, acetic acid, propionic acid, butanoic acid, lactic acid, glycolic acid, oxalic acid, tartaric acid, citric acid, maleic acid, fumaric acid, citraconic acid, gluconic acid, thioglycolic acid, glycine, adipic acid, 6-aminohexanoic acid, aminoadipic acid, 4-aminobutanoic acid, 2-amino-4-hydroxybutanoic acid, 2-aminobutanoic acid, aspartic acid, salicylic acid, nitrilotriacetic acid, ethylenediaminetetraacetic acid (EDTA), hydroxy ethylenediaminetriacetic acid, 1,3-propylene diamine tetracetic acid, methylglycinediacetic acid, diethylenetriamine-pentaacetic acid (DTPA), and combinations thereof.

Optionally, these compounds can be treated with at least one basic compound selected from ammonia, amines, sodium hydroxide, potassium hydroxide and mixtures thereof, increasing their stability and/or solubility in water.

The water-soluble organic compounds of Sb and/or W are generally available on the market or are easily obtainable by reaction in water between a compound of Sb and/or of W, usually inorganic (e.g. trioxide antimony) and the corresponding carboxylic acid.

In one embodiment, the component (D) is an antimony and sodium salt of tartaric acid.

The presence of the component (D) in the colouring composition causes a variation in the hue of the yellow colour produced during firing of the decorated material, that veers towards a lemon shade of yellow.

The colouring composition can further comprise an amount less than or equal to 1.5% by weight of at least one functional additive (E) that allows optimising the chemical-physical characteristics of the composition, wherein the amount of additive refers to the overall weight of the colouring composition. Preferably, the at least one additive can be selected from the group consisting of pH regulators, surfactants, viscosity modifiers, thickeners, preservatives, dispersing agents, antifoaming agents and mixtures thereof.

In a preferred embodiment, the colouring composition, in particular the ink for ink jet printing, can comprise an amount less than or equal to 1.5% by weight, preferably 0.01-1.5% by weight, more preferably 0.1-1.0% by weight of at least one surfactant (E), preferably of at least one nonionic surfactant. More preferably, the nonionic surfactant can be at least one ethoxylated alcohol, even more preferably one ethoxylated alcohol, with a degree of ethoxylation comprised between 5 and 9.

In a preferred embodiment, the colouring composition can be an ink for ink jet printing having at least one of the following properties, preferably both:
viscosity at printing temperature comprised between 3.0 and 20.0 mPa·s, preferably between 4.0 and 15.0 mPa·s; and/or
surface tension at printing temperature comprised between 20 and 40 mN/m, preferably between 25 and 30 mN/m.

The viscosity of the ink can vary depending on the type of heads that are used for printing.

In one embodiment, the printing temperature can preferably be approximately 30° C. and corresponds to the temperature at which viscosity and/or surface tension are measured.

In a further aspect thereof, the invention relates to a process for decorating on ceramics, preferably for ink jet printing on ceramics, comprising the steps of:
(1) applying, preferably ink jet printing, the colouring composition as described in detail above onto the surface of an additivated paste comprising a mixture of ceramic raw materials comprising a total amount less than or equal to 2.00% by weight of titanium dioxide, obtaining a decorated ceramic paste;
(2) optionally, but preferably, drying the decorated ceramic paste;
(3) firing the decorated, and optionally dried, ceramic paste in a ceramics kiln at a temperature of 900°-1300° C.

The paste of step (1) preferably comprises a total amount of about 0.05-1.50% by weight, more preferably about 0.05-0.70% by weight, even more preferably about 0.10-0.30% by weight of titanium dioxide, wherein the quantity of titanium dioxide refers to the overall dry weight of the mixture comprising the additives.

The ceramic raw materials will naturally comprise an amount of titanium dioxide less than or equal to about 0.50% by weight.

In one embodiment, step (1) can comprise adding to a mixture of ceramic raw materials a quantity less than or equal to 1.50% by weight, preferably 0.05-1.50% by weight, more preferably 0.05-0.70% by weight, still more preferably 0.10-0.30% by weight of titanium dioxide in the form of rutile and/or anatase, preferably rutile.

The mixture of ceramic raw materials comprises materials of natural origin belonging to the categories of clayey, flux and inert materials. The clay materials, such as clays and kaolin, with the addition of water form a plastic paste that allow maintaining the shape of the semi-processed ceramic material. The inert materials, such as quartz-based sands, serve to give structure to the paste during firing. The flux materials, such as feldspar, promote the formation of the vitreous phases necessary for the sintering of the raw materials during firing. Depending on the type of ceramic material to be obtained, the proportion between these components can be varied in a manner known per se to those skilled in the art.

In one embodiment, step (1) can comprise applying, preferably ink jet printing, the colouring composition described above on the surface of a raw additivated paste comprising a mixture of ceramic raw materials comprising:

a total amount less than or equal to 2.00% by weight, preferably about 0.05-1.50% by weight, more preferably about 0.05-0.70% by weight, even more preferably about 0.10-0.30% by weight of titanium dioxide; and about 0.10-2.00% by weight, preferably about 0.20-1.00% by weight of $Sb_2O_3$, where the amount of titanium dioxide and antimony oxide refer to the overall dry weight of the mixture comprising the additives.

The mixture of ceramic raw materials comprising $TiO_2$ and, optionally, $Sb_2O_3$ can form the entire mass of the raw additivated paste or, preferably, can be present only on the surface to be decorated.

In one embodiment, step (1) can comprise:
(1.1) mixing the amount of $TiO_2$, and optionally of $Sb_2O_3$ indicated above to the ceramic raw materials in any order, obtaining an additivated mixture;
(1.2) optionally, but preferably, atomising the additivated mixture to obtain an additivated atomised paste;
(1.3) forming, preferably pressing, the additivated mixture or the additivated atomised paste, obtaining a raw additivated paste;
(1.4) applying, preferably ink jet printing, the colouring composition on the surface of the raw additivated paste.

The titanium dioxide, and optionally the antimony trioxide, can be mixed with the ceramic raw materials upstream of the entire processing cycle, i.e. to the dry ceramic raw materials before grinding.

Alternatively, the titanium dioxide, and optionally the antimony trioxide, can be suspended in water and added to the aqueous suspension of ceramic raw materials (slip) in output from the grinding mill.

During the forming, the additivated mixture or the additivated atomised paste can form the entire mass of the ceramic paste (full-body). Alternatively, a layer comprising the additivated mixture or the additivated atomised paste can be arranged over a layer of raw ceramic paste comprising a mixture of non-additivated ceramic raw materials (double loading).

These forming techniques can be advantageously used to produce substantially planar ceramic products, for example tiles, that can be smoothed after firing.

0.1-2.0 mm thickness of the decorated surface is removed in the smoothing by means of special wheels. The smoothed surface can be polished to a mirror-like effect.

In a further embodiment, step (1) can comprise:
(1.a) providing an aqueous suspension (slip) onto the surface of a raw formed ceramic paste (green body), the aqueous suspension comprising:

50.0-70.0% by weight of a mixture of ceramic raw materials comprising a total amount less than or equal to 2.00% by weight, preferably comprising about 0.05-1.50% by weight, more preferably about 0.05-0.70% by weight, even more preferably about 0.10-0.30% by weight of $TiO_2$, and, optionally, about 0.10-2.00% by weight, preferably about 0.20-1.00% by weight of $Sb_2O_3$, wherein the amount of $TiO_2$ and $Sb_2O_3$ refer to the overall dry weight of the mixture comprising the additives; and 30.0-50.0% by weight of water,
thereby obtaining a raw additivated paste; and
(1.b) applying, preferably ink jet printing, the colouring composition on the surface of the raw additivated paste.

The aqueous suspension can be applied onto the surface of the green body with techniques and equipment that are per se known in the art, for example by spraying, typically in airless cabins; by depositing a uniform layer of the suspension, with the Vela® system of Eurotecnica—Ceramic Engineering Division (Sassuolo, MO.) or with the bell system. The aqueous suspension can be applied in quantities of about 300-1400 $g/m^2$, preferably about 400-900 $g/m^2$.

The slip can also contain suspending and/or fluidising agents for maintaining the suspension stable. The type and amount of suspending and/or fluidising agents are known per se to those skilled in the art.

This variant of the process is useful for the creation of the ceramic objects that are not subjected, after firing, to subsequent surface processing or to the creation of substantially planar ceramic products that after firing are lapped, i.e. products whose decorated surface is abraded with a wheel, removing a surface thickness comprised between about 10 µm and about 200 µm.

In the embodiments described above the colouring composition is applied on a raw additivated paste.

In a further embodiment, the colouring composition can be applied on an additivated paste partially baked at a temperature of about 950°-980° C. (bisque).

The partially baked additivated paste can advantageously have a residual porosity of about 12-18%. The additivated paste can be prepared according to one of the embodiments described in detail above.

In one embodiment, step (1) can comprise applying the colouring composition using traditional ceramic decoration techniques, preferably selected from flat screen printing and/or rotary screen printing with engraved rollers (Rotocolor®). In this embodiment, the colouring composition can be applied in an amount comprised between about 20 g and about 300 g of colouring composition per $m^2$ of coloured surface, preferably about 30-100 $g/m^2$.

Alternatively and preferably, the colouring composition can be an ink for digital printing and step (1) can comprise ink jet printing the colouring composition (ink) in an amount preferably comprised between about 2 g and about 80 g of ink per $m^2$ of coloured surface, preferably about 5-60 $g/m^2$, even more preferably about 10-40 $g/m^2$.

To have an optimal chromatic yield of the ink, the temperature of the additivated paste at the time of printing can advantageously be less than or equal to 50° C., more preferably less than or equal to 35° C.

In one embodiment, step (1) can further comprise at least one step (i) of applying on the surface of the raw additivated paste a solution comprising water and/or at least one salt selected from the group consisting of sodium salts and/or ammonium salts of linear or branched C2-C6 saturated or unsaturated mono- or polycarboxylic acids, optionally substituted with at least one group selected from —OH, —SH, —N(R8)$_2$ wherein the groups R8, equal or different from each other, are independently selected from H, linear or branched C1-C4 saturated alkyl groups, optionally substituted with at least one substituent selected from the group consisting of —OH, —(CH$_2$)n-COOH wherein n is an integer comprised between 1 and 3, —(CH$_2$)$_m$—N(H)$_{2-k}$—(CHR9-COOH)$_k$ wherein m is an integer comprised between 1 and 6, k is 1 or 2 and R9 is selected between—H and —CH$_3$, and mixtures thereof.

Preferably, the salt can be selected from sodium salts and/or ammonium salts of an acid selected from the group consisting of citric acid, ethylenediaminetetraacetic acid, lactic acid, glycolic acid, acetic acid and mixtures thereof.

The solution of step (i) can be applied to the surface of the raw additivated paste using flat screen printing, engraved roller screen printing, ink jet printing, spraying or combinations thereof.

Step (i) can be carried out before and/or after, preferably after, the step of applying the colouring composition.

In one embodiment, step (i) can be carried out after step (1.3) and before step (1.4), pre-treatment, by applying an amount less than or equal to 100 g/m$^2$, preferably by applying 50-100 g/m$^2$, and/or after step (1.4), post-treatment, by applying an amount of solution of about 100-400 g/m$^2$.

In a further embodiment, step (i) can be carried out between step (1.a) and step (1.b), pre-treatment, by applying an amount less than or equal to 50 g/m$^2$, preferably by applying about 10-50 g/m$^2$ of solution, and/or after step (1.b), post-treatment, by applying an amount less than or equal to 200 g/m$^2$, preferably by applying about 50-200 g/m$^2$, of solution.

The presence of at least one step (i) favours a uniform penetration of the colouring composition inside the raw additivated paste.

In step (3) the decorated ceramic paste is fired, preferably in a roller kiln, at temperature comprised between 900° C. and 1300° C. The firing cycle depends on the type of ceramic material that is to be produced. Normally, the firing cycle of the additivated ceramic paste can vary slightly with respect to the firing cycle of the same non-additivated paste, in particular as regards the maximum firing temperature. The maximum firing temperature of the additivated ceramic paste is generally comprised in a range of about ±20° C. with respect to the maximum firing temperature of the same non-additivated ceramic paste ("standard" firing cycle). The person skilled in the art, based on his knowledge of the art, is able to make the necessary changes to the "standard" firing cycle of a ceramic paste to make it adapted to the firing of the additivated ceramic paste.

The titanium compound as described above is particularly useful for the creation of a water-based colouring composition, in particular of an ink for ink jet printing, with a high concentration of titanium in combination with the appropriate viscosity for printing with the ink jet printing devices currently present on the market.

In a further aspect thereof, the invention therefore relates to the use of a titanium compound as described above for the preparation of a colouring composition for the decoration of a ceramic paste, preferably for preparing an ink for ink jet printing on a ceramic paste.

The colouring composition develops a saturated yellow colour or one tending to yellow during the firing of the ceramic paste. The colouration is particularly intense thanks to the high concentration of titanium in the composition.

Furthermore, the ink for ink jet printing has advantages in terms of safety and hygiene at work, as well as a lower environmental impact with respect to the inks for ink jet printing containing titanium which are completely solvent-based.

It has also been found that, thanks to the chromatic impression of the ink, it is possible to obtain not only a yellow colouration or one tending to yellow of the printed ceramic paste, but also a broad gamut when the ink is used in combination with additional inks for ink jet printing known in the art and used in printing in three or four colours.

In a further aspect thereof, the invention therefore relates to a set of inks for ink jet printing on a ceramic paste comprising:

(I1) the ink as described above;

(I2) an ink comprising at least one water-soluble organic compound of Co and a solvent selected from water, an organic solvent miscible with water and mixtures thereof; and (I3) an ink comprising at least one water-soluble organic compound of Au or at least one water-soluble organic compound of Fe, and a solvent selected from water, an organic solvent miscible with water and mixtures thereof; and optionally (I4) an ink comprising at least one water-soluble organic compound of Ru or at least one water-soluble organic compound of Fe and at least one water-soluble organic compound of Co, and a solvent selected from water, an organic solvent completely miscible with water and mixtures thereof.

In a first embodiment, the set of inks may be a first set of inks for ink jet printing on a ceramic paste, wherein the set comprises:

(I1) the ink according to the present disclosure, as described above in detail;

(I2) an ink comprising at least one water-soluble organic compound of cobalt and a solvent selected from water, an organic solvent completely miscible with water and mixtures thereof; and (I3) an ink comprising at least one water-soluble organic compound of gold and a solvent selected from water, an organic solvent completely miscible with water and mixtures thereof.

The ink (I2) can comprise at least one water-soluble organic compound of Co preferably selected from the group consisting of:

ascorbate;

acetylacetonate;

compounds with one carboxylic acid of formula R3-COOH wherein R3 has the same meaning as described in detail above; and mixtures thereof, optionally treated with at least one basic compound selected from ammonia, amines, sodium hydroxide, potassium hydroxide and mixtures thereof.

Preferably, the ink (I2) can comprise cobalt EDTA stabilised with ammonia. The ink (I2) can comprise 0.3-7.0% by weight of cobalt, preferably 0.5-5.0% by weight.

The ink (I3) preferably comprises one water-soluble organic compound of Au selected from the group of compounds of formula Au—S—R10 wherein R10 is selected among:

(i.i) a linear or branched C1-C4 saturated alkyl group, optionally substituted with one or more groups selected from —COOH, —N(H)$_{2-k}$(COCH$_3$)k wherein k is an integer comprised between 0 and 2; and (i.ii) a radical of formula —CHR9-CO—NH—(CH$_2$)m-COOH wherein R9 is selected from H and a linear or branched C1-C3 saturated alkyl group and m is an integer comprised between 0 and 2.

Preferably the ink (I3) comprises gold N-acetylcysteinate. The compounds of Au reported above are described in patent EP1105358. The ink (I3) can preferably comprise 0.1-2.0% by weight of Au.

Optionally, the set of inks can further comprise an ink (I4) comprising at least one water-soluble organic compound of ruthenium and a solvent selected from water, an organic solvent completely miscible with water and mixtures thereof.

The ink (I4) can comprise at least one water-soluble organic compound of Ru selected from the group consisting of compounds of ruthenium with carboxylic acids of formula R3-COOH wherein R3 has the same meaning as described in detail above, and mixtures thereof, optionally treated with at least one basic compound selected from ammonia, amines, sodium hydroxide, potassium hydroxide and mixtures thereof.

Preferably, the ink (I4) can comprise ruthenium glycolate stabilised with ammonia and/or ruthenium citrate stabilised with ammonia and/or ruthenium EDTA stabilised with ammonia.

The ink (I4) can preferably comprise 1.0-10.0% by weight of Ru, preferably 0.5-6.0% by weight.

This first set of inks is applied by ink jet printing to a raw additivated paste according to the process described above.

This first set of inks makes it possible to obtain a very broad and therefore satisfactory gamut for the market. However, the inks (I3) and (I4) contain precious metals which generally have a rather high cost.

For this reason, the Applicant has developed a second set of inks for ink jet printing on a ceramic paste comprising:
(I1) the ink according to the present invention, as described above;
(I2) an ink comprising at least one water-soluble organic compound of cobalt and a solvent selected from water, an organic solvent completely miscible with water and mixtures thereof; and
(I5) an ink comprising at least one water-soluble organic compound of iron and a solvent selected from water, an organic solvent completely miscible with water and mixtures thereof.

Furthermore, this further set of inks can optionally comprise an ink (I6) comprising at least one water-soluble organic compound of iron and at least one water-soluble organic compound of cobalt and a solvent selected from water, an organic solvent completely miscible with water and mixtures thereof.

The cobalt compound of the ink (I6) can be the same cobalt compound of the ink (I2) described above.

The ink (I5) and/or the ink (I6) can comprise at least one water-soluble organic compound of Fe preferably selected from the group consisting of:
ascorbate;
acetylacetonate;
compounds with one carboxylic acid of formula R3-COOH wherein R3 has the same meaning as described above; and
mixtures thereof,
optionally treated with at least one basic compound selected from ammonia, amines, sodium hydroxide, potassium hydroxide and mixtures thereof.

Preferably, the ink (I5) and/or the ink (I6) can comprise iron ammonium citrate and/or iron EDTA stabilised with ammonia.

The ink (I5) can comprise 2.0-13.0% by weight, preferably 4.0-11.0% by weight, of iron.

The ink (I6) can comprise 0.5-7.0% by weight of cobalt and 0.5-7.0% by weight of iron.

The organic solvents completely miscible with water useful in the preparation of the inks from (I2) to (I6) are selected from the solvents comprised in component (C) of the colouring composition described in detail above.

The inks from (I2) to (I6) can further comprise small traces of salts and/or water-soluble organic complexes of additional chromophoric metals known in the art to slightly modify the chromatic impression of the chromophoric metals.

The second set of inks can be used in an ink jet printing process as described above, wherein the raw additivated paste comprises a mixture of ceramic raw materials comprising:

a total amount less than or equal to 2.00% by weight, preferably about 0.05-1.50% by weight, more preferably about 0.05-0.70% by weight, even more preferably about 0.10-0.30% by weight of titanium dioxide;

amorphous silica in an amount of about 0.50-10.00% by weight, preferably about 2.00-7.00% by weight; and optionally an amount of about 0.10-2.00% by weight, preferably about 0.20-1.00% by weight, of $Sb_2O_3$, where the amount of titanium dioxide, amorphous silica and antimony oxide refer to the overall weight of the dry mixture comprising the additives.

The amorphous silica is chosen among precipitated silica, silica gel and mixtures thereof and is characterised by active surface area $S \geq 100$ $m^2/g$, wherein said active surface area is defined by the formula $S = A \times Gr$, wherein Gr is the grain size fraction comprised between 5-60 μm for precipitated silica and 1-60 μm for silica gel; and A is the surface area of the silica in $m^2/g$ as measured through the B.E.T. method.

The grain size of the silica is that which is obtained using a granulometer with laser diffraction detector as provided for by the standard ISO 13320-1 (1999), equipped with wet sampler. The silica samples are usually treated before analysis (for example by stirring, treatment with ultrasound or addition of surfactants) so as to obtain a stable dispersion of the particles in the solvent used for the determination (generally water). These treatments break the labile tertiary structures (aggregates) and the grain size measured corresponds to that of the stable secondary particles (agglomerates). Further characteristics of the amorphous silica adapted to the embodiment of the process are described in detail in patent application WO2005/063650, the content of which is incorporated herein for reference. When the amorphous silica is mixed with the ceramic raw materials prior to grinding, the amorphous silica can have an initial grain size greater than 60 μm and active surface area less than 100 $m^2/g$. When the amorphous silica is added to the ceramic raw materials downstream of the grinding process, the amorphous silica preferably has an initial grain size of about 5-60 μm for precipitated silica and of about 1-60 μm for silica gel.

The following examples are provided for illustrative purposes only and are not intended to in any way limit the object of the present disclosure.

EXAMPLES

The following processes are used to determine the properties indicated in the entire description and in the appended claims.

Viscosity: the viscosity is measured with a CS10 Bohlin (Malvern) rheometer in the cylinder configuration in titanium/stainless steel Bob-cup C25 DIN 53019; oil calibration standard Reotek PSL with viscosity at 40° C. =14.23 cP. Before performing the measurement, the calibration of the instrument is checked with the standard at a known viscosity, at the reference temperature of the standard. The correction factor "f" to be applied to the analytical data of viscosity is determined according to the following equation:

$$f = visc \cdot TS / visc \cdot MS$$

wherein visc.TS is the viscosity of the standard and visc.MS is the viscosity of the sample analysed.

The end stroke of the instrument is placed at 0.150 mm. 20 ml of the solution to be analysed is loaded in the rheometer. The sample is thermostated at the temperature at which the measurement is carried out (±0.1° C.). When thermal equilibrium is reached, a pre-shearing of 300 1/s is performed with a duration of 30 s, followed by a rest time of 10 s. The measurement is carried out by acquiring the viscosity data with a shearing of 50 1/s, for 300 s, with the acquisition of 1 data/s. The measurement is repeated 2 times. For each sample the viscosity value is given by the average of the last 6 data of the second measurement, multiplied by the correction factor "f".

Surface tension: the surface tension of the samples is measured with a bubble pressure tensiometer model Sinterface BPA-1S equipped with a stainless steel Cod. 26O14 (Sinterface) capillary having the following characteristics: radius=0.130 mm; calibration coefficient=0.794; volume of the reference bubble=6.40; reference dead time=48 ms; immersion depth=5 mm. After having carried out the auto-calibration procedure of the instrument, the samples to be analysed are placed in a beaker thermostated at 20° C. in which the capillary is immersed. The viscosity values (expressed in cSt) and density values (expressed in g/cm$^3$) referring to the sample to be analysed are inserted into the instrument. The measurement of the surface tension is performed in the time interval of life between 0.01 and 30 s, for a measurement time of 30 min. The data at 1 s (1 Hz) is used as the surface tension value.

Density: the density measurement is carried out with a portable Densito DMA 35N Anton Paar density meter, thermostating the sample at 25° C. Each sample is analysed three times, taking the average of the three values as the density value.

Lab: spectrophotometer i1Basic Pro 2 sold by X-Rite Inc.

Residual porosity: record the weight of the sample of baked ceramic material, immerse the sample in hot water, bring to a boil and keep the sample immersed in boiling water for about 10 minutes. Withdraw the sample from the water, dry it externally and record the weight. The residual porosity is expressed as a percentage increase of the weight of the sample with respect to the initial weight.

Example 1

To a solution obtained by mixing 2117.0 g of tetraisopropyl titanate (7.4 moles) with 402.2 g of isopropanol, 1211.2 g of demineralised water (exothermic reaction) were added slowly under stirring. 807.0 g of glycolic acid at 70% (7.4 moles) were added to the white suspension formed. Subsequently, the temperature of the reaction mixture was raised up to 80-90° C., while distilling a mixture of isopropanol/water. The distillation was interrupted after having collected 2098.0 g of distillate having a density of 0.83 g/cm$^3$ to add 224.7 g of monoethanolamine (2.6 moles) to the reaction mixture rapidly and under stirring. The distillation was resumed and continued until obtaining a distillate with density=1.00 g/cm$^3$.

At the end of the distillation the reaction mixture was presented as an aqueous solution of light-yellow colour containing 18.1% of Ti.

The solution at 10% by weight of Ti was obtained by diluting the solution obtained at the end of the reaction with water.

Examples 2 and 3

Using the process of example 1, compounds of Ti were prepared by varying the ratio between Ti and glycolic acid, maintaining the Ti:monoethanolamine ratio constant. The amounts of reagents used are listed in table 1.

The solutions at 10% by weight of Ti were obtained by diluting the solutions obtained at the end of the reaction with water.

TABLE 1

|  |  | Example 1 (rx1) | Example 2 (rx15) | Example 3 (rx16) |
|---|---|---|---|---|
| TIPT | moles | 7.4 | 1.242 | 1.242 |
| Isopropanol | g | 402.2 | 70.0 | 61.95 |
| Water | g | 1211.2 | 201.8 | 203.9 |
| Glycolic acid | moles | 7.4 | 1.863 | 2.2515 |
| Ti:acid molar ratio |  | 1:1 | 1:1.5 | 1:2.0 |
| monoethanolamine | moles | 2.6 | 0.416 | 0.416 |
| Ti:amine molar ratio |  | 1:0.334 | 1:0.335 | 1:0.335 |
| Final solution weight | g | / | 340.31 | 492.1 |
| Conc. Ti | % by weight | 18.1 | 17.5 | 12.1 |
| Viscosity solution at 10% by weight Ti | mPa · s | 2.5 | 4.1 | 6.8 |

Examples 4 and 5

Using the same process used to prepare the Ti compound of example 1, titanium compounds with glycolic acid and triethanolamine were prepared in the ratios shown in table 2

The solutions at 10% by weight of Ti were obtained by diluting the solutions obtained at the end of the reaction with water.

TABLE 2

|  |  | Example 4 (rx13) | Example 5 (rx14) |
|---|---|---|---|
| TIPT | moles | 1.242 | 1.242 |
| Isopropanol | g | 68.0 | 68.0 |
| Water | g | 201.8 | 201.8 |
| Glycolic acid | moles | 1.242 | 2.514 |
| Ti:acid molar ratio |  | 1:1.0 | 1:2.0 |
| monoethanolamine | moles | 0.415 | 0.415 |
| Ti:amine molar ratio |  | 1:0.334 | 1:0.334 |
| Final solution weight | g | 392.5 | 428.6 |
| Conc. Ti | % by weight | 15.0 | 13.8 |
| Viscosity solution at 10% by weight Ti | mPa · s | 3.5 | 27 |

Examples 6-8

Using the process of example 1, titanium compounds with glycolic acid and monoethanolamine were prepared in the ratios shown in table 3. The solution at 10% by weight of Ti was obtained by diluting the solution obtained at the end of the reaction with water.

TABLE 3

|  |  | Example 6 (rx40) | Example 7 (rx39) | Example 8 (rx3) |
|---|---|---|---|---|
| TIPT | moles | 2.730 | 2.730 | 2.733 |
| Isopropanol | g | 169.3 | 169.3 | 149.5 |
| Water | g | 444.2 | 444.2 | 444.2 |
| Glycolic acid | moles | 2.766 | 2.766 | 2.766 |
| Ti:acid molar ratio |  | 1:1.0 | 1:1.0 | 1:1.0 |
| monoethanolamine | moles | 1.106 | 1.546 | 2.301 |
| Ti:amine molar ratio |  | 1:0.40 | 1:0.60 | 1:0.8 |
| Final solution weight | g | 725.6 | 735.8 | 688.6 |
| Conc. Ti | % by weight | 18.0 | 18.1 | 18.1 |
| Viscosity solution at 10% by weight Ti | mPa · s | / | / | 3.5 |

Example 9

Using the process of example 1, the titanium compound with glycolic acid and diethylamine was prepared in the ratios shown in table 4

TABLE 4

|  |  | Example 9 (rx31) |
|---|---|---|
| TIPT | moles | 2.730 |
| Isopropanol | g | 157.5 |
| Water | g | 447.2 |
| Glycolic acid | moles | 2.766 |
| Ti:acid molar ratio |  | 1:1.0 |
| diethylamine | moles | 1.911 |
| Ti:amine molar ratio |  | 1:0.7 |
| Final solution weight | g | 730.9 |
| Conc. Ti | % by weight | 17.8 |

Examples 10-17

In a 100-litre capacity reactor rendered inert by the presence of nitrogen, 24 Kg of tetraisopropyl titanate and 4.7 Kg of isopropyl alcohol are loaded. 13.8 Kg of demineralised water are slowly added to the solution. The reaction is strongly exothermic. After completely adding the water, 9.4 Kg of glycolic acid at 70% by weight are added. The temperature of the reaction mixture is brought to 90° C. and about 21.3 Kg of an isopropanol/water mixture distil.

The reaction mixture is cooled to about 65° C. by a heat exchanger and 2.7 Kg of monoethanolamine at 90% by weight is slowly added. The reaction is slightly exothermic. The reaction mixture is again brought to about 90° C. and a mixture of isopropanol/water again distils. The distillation is interrupted when the density of the distillate is equal to 1 g/cm$^3$.

At the end of the distillation a solution of an intense yellow colour is obtained with a Ti content of 20.9% by weight.

The solution was used to prepare the inks of examples 10-18 containing in addition to the titanium compound also chromium acetate, optionally an antimony salt and tartaric acid sodium and suitable solvents. All the inks also contain 0.5% by weight of an ethoxylated alcohol, with the ethoxylation degree 7 as surfactant. The compositions of the inks are listed in table 5.

The inks were printed with an ink jet plotter on tiles obtained from a raw ceramic paste for porcelain stoneware on which 750 g/m$^2$ of a composition comprising 67% by weight of a mixture of ceramic raw materials comprising 5% by weight of silica gel, 0.5% by weight of $Sb_2O_3$ and 0.1% by weight of rutile $TiO_2$ were applied by veil (vela).

The ceramic paste was fired at 1215° C. (Tmax) with a firing cycle for porcelain stoneware lasting about 55 minutes.

The Lab values refer to a printing density of 50%, i.e. to the printing of a number of coloured dots that allow covering 50% of the surface and were measured on the raw tile (surface not processed after firing).

TABLE 5

|  | Ti % by weight | Cr % by weight | Sb % by weight | Viscosity (30° C.) cP |
|---|---|---|---|---|
| Example 10 (comp. B1) | 11.7 | 1.5 | \ | 12.9 |
|  | monoethylene glycol 15% by weight glycerol 1% by weight DPM (*) 5% by weight | | | |
| Example 11 (comp. B1/2) | 12.9 | 1.5 | \ | 17.0 |
|  | diethylene glycol 18% by weight DPM 5.4% by weight | | | |
| Example 12 (comp. B1/3) | 12.9 | 1.5 | \ | 16.3 |
|  | monoethylene glycol 18% by weight DPM 5.4% by weight | | | |
| Example 13 (comp. B1/5) | 9.4 | 1.5 | 3.1 | 19.2 |
|  | diethylene glycol 10.5% by weight DPM 5% by weight | | | |
| Example 14 (comp. B1/13) | 10.7 | 1.3 | \ | 9.8 |
|  | monoethylene glycol 26% by weight DPM 5% by weight | | | |
| Example 15 (comp. B1/14) | 12.4 | 1.5 | \ | 9.1 |
|  | diethylene glycol 8% by weight demineralised water 10% by weight DPM 5.4% by weight | | | |
| Example 16 (com. B1/17) | 5.4 | 2.3 | 5.2 | 10.4 |
|  | diethylene glycol 10% by weight DPM 6.5% by weight | | | |
| Example 17 (comp. B1/18) | 5.0 | 2.1 | 4.9 | 9.0 |
|  | diethylene glycol 6% by weight demineralised water 10% by weight DPM 6.5% by weight | | | |

(*) di(propylene) glycol methyl ether

TABLE 6

|  | L | a | b |
|---|---|---|---|
| DEPOSIT | 85.89 | 0.09 | 7.25 |
| Example 10 | 70.65 | 11.29 | 45.88 |
| Example 11 | 74.31 | 10.55 | 48.04 |
| Example 12 | 74.11 | 10.41 | 49.27 |
| Example 13 | 76.46 | 7.02 | 52.51 |
| Example 14 | 78.94 | 3.49 | 44.01 |
| Example 15 | 78.38 | 5.57 | 45.25 |
| Example 16 | 76.03 | 4.38 | 44.77 |
| Example 17 | 76.03 | 4.21 | 44.08 |

Examples 18-20

Some of the above compositions were printed with an ink jet plotter on tiles obtained from the same raw additivated paste of the previous examples. After printing 40 g/m$^2$ of post treatment were applied with a 62-wires, full field mesh, consisting of an aqueous solution comprising 3.6% of disodium hydrogen citrate.

The ceramic paste was baked with a firing cycle for porcelain stoneware as in the examples 10-17. The Lab values reported in table 7 were measured on the raw tile and on the lapped tile (lapping depth about 0.05-0.1 mm).

TABLE 7

|  | L | a | b | L | a | b |
|---|---|---|---|---|---|---|
|  |  | Raw |  |  | Lapped |  |
| DEPOSIT | 86.25 | −0.02 | 6.53 | 86.21 | 0.01 | 6.87 |
| Example 18 (comp. B1/5) | 76.80 | 7.49 | 43.64 | 76.86 | 7.57 | 50.43 |
| Example 19 (comp. B1/13) | 78.76 | 4.97 | 37.57 | 78.22 | 5.16 | 41.57 |
| Example 20 (comp. B1/14) | 77.41 | 6.98 | 43.84 | 77.21 | 7.1 | 47.78 |

Examples 21-22

In a 100-litre capacity reactor rendered inert by the presence of nitrogen, 34.4 Kg of tetraisopropyl titanate and 6.5 Kg of isopropyl alcohol are loaded. 19.8 Kg of demineralised water are slowly added to the solution. The reaction is strongly exothermic. After completely adding the water, 13.5 Kg of glycolic acid at 70% by weight are added. The temperature of the reaction mixture is brought to 90° C. and about 20.0 Kg of an isopropanol/water mixture distil. At the end of this step 2.4 Kg of demineralised water are added to maintain the reaction mass fluid.

The reaction mixture is cooled to about 65° C. by a heat exchanger and 3.9 Kg of monoethanolamine at 90% by weight is slowly added. The reaction is slightly exothermic. The reaction mixture is again brought to about 90° C. and a mixture of isopropanol/water again distils. The distillation is interrupted when the density of the distillate is equal to 1 g/cm³.

At the end of the distillation a solution of an intense yellow colour is obtained with a Ti content of 16.35% by weight.

The solution was used to prepare the formulations of example 21 and 22, whose compositions are reported in table 8.

Comparative Examples 23 and 24

Similar formulations, example 23 and 24, were obtained starting from a commercial product of titanium lactate containing 8.0% of Ti.

To obtain the concentration of Ti similar to those of the formulations of examples 21 and 22, water was evaporated in such a way as to reach 100 grams. All the compositions contain 0.5% in weight of a surfactant, an ethoxylated alcohol with ethoxylation degree 7.

TABLE 8

|  | Ti % by weight | Cr % by weight | Viscosity (30° C.) cP |
|---|---|---|---|
| Example 21 (comp. 271/1) | 10.1 | 1.29 | 8.5 |
|  | Monoethanolamine 90% 13.1% by weight | | |
|  | Demineralised water 22.6% by weight | | |
|  | Monoethylene glycol 1.3% by weight | | |
|  | Glycerol 1.3% by weight | | |
| Example 22 (comp. 272/1) | 10.1 | 1.29 | 6.0 |
|  | Monoethanolamine 90% 5.4% by weight | | |
|  | Demineralised water 13.4% by weight | | |
|  | Diethylene glycol 7.4% by weight | | |
|  | Dipropylene glycol monoethyl ether 0.8% by weight | | |
| Ex. Comp. 23 (comp. 274/1) | 10.1 | 1.29 | 146 |
|  | Monoethanolamine 90% 13.1% by weight | | |
|  | Demineralised water 22.6% by weight | | |
|  | Monoethylene glycol 1.3% by weight | | |
|  | Glycerol 1.3% by weight | | |
| Ex. Comp. 24 (comp. 275/1) | 10.1 | 1.29 | 91.2 |
|  | Monoethanolamine 90% 5.4% by weight | | |
|  | Demineralised water 13.4% by weight | | |
|  | Diethylene glycol 7.4% by weight | | |
|  | Dipropylene glycol monoethyl ether 0.8% by weight | | |

The invention claimed is:

1. A colouring composition, preferably an ink for ink jet printing, comprising:
   (A) 3.0-15.0% by weight of Ti in the form of a titanium compound obtained by a process comprising:
      (i) reacting at least one titanium alkoxide of formula $Ti(OR1)_4$, wherein R1 is a linear or branched C1-C4 saturated alkyl radical, with water and, optionally, at least one alcohol, obtaining a first reaction mixture;
      (ii) adding glycolic acid to the reaction mixture of step (i) in a Ti:acid molar ratio comprised between 1:0.8 and 1:2.0, obtaining a second reaction mixture comprising water, alcohol and at least one intermediate titanium compound;
      (iii) optionally, at least partially removing the water and alcohol from the second reaction mixture;
      (iv) adding to the mixture of step (ii) or of step (iii) at least one compound of formula $N(R2)_3$, wherein the R2 groups, whether the same or different from each other, are independently selected from the group consisting of H, $CO(NH_2)$, linear or branched C1-C4 alkyl radicals, linear or branched C1-C4 alcohols, and combinations thereof, in a Ti:N(R2)3 molar ratio comprised between 1:0.20 and 1:1.50; and
      (v) completely eliminating the alcohol from the mixture of step (iv);
   (B) 0.2-2.5% by weight of Cr and/or Ni in the form of a water-soluble organic compound of Cr and/or a water-soluble organic compound of Ni;
   (C) up to 100% by weight of a solvent selected from the group consisting of water, organic solvents miscible with water and mixtures thereof,
   wherein the quantities (A), (B) and (C) refer to the overall weight of the colouring composition.

2. The colouring composition according to claim 1, wherein the compound of formula $N(R2)_3$ of step (iv) is selected from the group consisting of diethylamine, diisopropylamine, triethanolamine, monoethanolamine and mixtures thereof.

3. The colouring composition according to claim 1, wherein the titanium alkoxide is selected from the group consisting of titanium tetra-methoxide, titanium tetra-ethoxide, titanium tetra-n-propoxide, titanium tetra-n-butoxide, titanium tetra-ter-butoxide, titanium tetra-isopropoxide and mixtures thereof.

4. The colouring composition according to claim 1, wherein the alcohol is a C1-C6 linear or branched alcohol, preferably selected from the group consisting of methanol, ethanol, 1-propanol, 2-propanol, 1-butanol, 2-methyl-1-propanol, 2-methyl-2-propanol and mixtures thereof.

5. The colouring composition according to claim 1, further comprising
   (D) 1.0-8.0% by weight of W and/or Sb in the form of at least one water-soluble organic compound of W and/or Sb.

6. The colouring composition according to claim 1, wherein the at least one water-soluble organic compound of Cr and/or Ni and/or W and/or Sb is selected from the group consisting of:
ascorbate;
acetylacetonate;
compounds with at least one carboxylic acid of formula R3-COOH wherein R3 is selected from the group consisting of:
(a)—H;
(b)—COOH;
(c) a radical of formula —C(R4)$_3$ wherein the R4 groups are the same or different from each other, and are independently selected from the group consisting of:
(c.1) H;
(c.2) a group of formula [1]

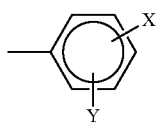

wherein X and Y are the same or different from each other and are independently selected from the group consisting of —CH$_3$, OH and COOH;
(c.3)—N(R5)$_2$ wherein the R5 groups are the same or different from each other and are independently selected from H, a linear or branched C1-C4 saturated alkyl group optionally substituted with at least one substituent selected from the group consisting of —OH, —(CH$_2$)n-COOH wherein n is an integer comprised between 1 and 3, —(CH$_2$)$_m$—N(H)$_{2-k}$—(CHR6—COOH)$_k$ wherein m is an integer comprised between 1 and 6, k is 1 or 2 and R6 is selected from —H and —CH$_3$, a group of formula [1] as described above, and combinations thereof;
(d) a linear or branched C1-C5 saturated or unsaturated alkyl group, optionally substituted with at least one substituent selected from the group consisting of —OH, —SH, —NH$_2$, —COOR7, wherein R7 is H or a linear or branched C1-C4 saturated aliphatic group, and combinations thereof;
(e) an aromatic group of formula [1] as described above; and
(f) combinations thereof; and
mixtures thereof,
wherein the compound is optionally treated with at least one basic compound selected from ammonia, amines, sodium hydroxide, potassium hydroxide and mixtures thereof.

7. The colouring composition according to claim 1, wherein the organic solvent miscible with water of the component (C) is selected from the group consisting of alkanolamines, polyalcohols, glycols, ethers, glycol ethers and mixtures thereof.

8. The colouring composition according to claim 1, wherein the component (C) comprises said water and 10-40% by weight of said organic solvent miscible with water, wherein the amount of the organic solvent refers to the total weight of the colouring composition.

9. The colouring composition according to claim 1, further comprising an amount equal to or less than 1.5% by weight of at least one functional additive (E) selected from the group consisting of pH regulators, surfactants, viscosity modifiers, thickeners, preservatives, dispersing agents, antifoaming agents and mixtures thereof, wherein the amount of the additive is referred to the overall weight of the colouring composition.

10. The colouring composition according to claim 1, wherein the composition is an ink for ink jet printing having at least one of the following properties:
printing temperature viscosity comprised between 3.0 and 20.0 mPa·s; and/or
printing temperature surface tension comprised between 20 and 40 mN/m.

11. A process for decorating ceramics, preferably for ink jet printing on ceramics, comprising the steps of:
(1) applying, preferably ink jet printing, the colouring composition as described in claim 1 on the surface of an additivated paste comprising a mixture of ceramic raw materials comprehensively comprising an amount of less than or equal to 2.00% by weight of titanium dioxide, thereby obtaining a decorated ceramic paste;
(2) optionally, drying the decorated ceramic paste;
(3) firing the decorated, and optionally dried, ceramic paste in a ceramics kiln at a temperature of 900-1300° C.

12. The process according to claim 11, wherein the ceramic paste further comprises 0.10-2.00% by weight of Sb$_2$O$_3$.

13. The process according to claim 11, wherein step (1) comprises ink jet printing the ink as recited in claim 1 in an amount of 2-80 g/m$^2$.

14. A set of inks for ink jet printing on a ceramic paste comprising:
(I1) the ink as described in claim 1;
(I2) an ink comprising at least one water-soluble organic compound of Co and a solvent selected from water, an organic solvent miscible with water and mixtures thereof; and
(I3) an ink comprising at least one water-soluble organic compound of Au or at least one water-soluble organic compound of Fe and a solvent selected from water, an organic solvent miscible with water and mixtures thereof; and optionally
(I4) an ink comprising at least one water-soluble organic compound of Ru or at least one water-soluble organic compound of Fe and at least one water-soluble organic compound of Co and a solvent selected from water, an organic solvent completely miscible with water and mixtures thereof.

15. Use of a titanium compound as described in claim 1 for preparing a colouring composition for the decoration of a ceramic paste.

16. The colouring composition according to claim 1, wherein the colouring composition comprises about 8.0-15.0% by weight of Ti in the form of said titanium compound.

17. The colouring composition according to claim 1, wherein the colouring composition comprises about 7.0-12.5% by weight of Ti in the form of said titanium compound.

18. The colouring composition according to claim 1, wherein the colouring composition comprises 0.8-1.5% by weight of Cr and/or Ni in the form of a water-soluble organic compound of Cr and/or a water-soluble organic compound of Ni.

19. The colouring composition according to claim 5, wherein the colouring composition comprises 2.5-5.5% by weight of W and/or Sb in the form of at least one water-soluble organic compound of W and/or Sb.

20. The colouring composition according to claim 7, wherein the organic solvent miscible with water of the component (C) is selected from the group consisting of monoethanolamine, diethanolamine, triethanolamine, monoethylene glycol, diethylene glycol, triethylene glycol, dipropylene glycol monomethyl ether, glycerol and mixtures thereof.

21. The colouring composition according to claim 8, wherein the organic solvent is selected from the group consisting of monoethanolamine, diethanolamine, triethanolamine, monoethylene glycol, diethylene glycol, triethylene glycol, dipropylene glycol monomethyl ether, glycerol and mixtures thereof.

* * * * *